United States Patent
Sakamoto

[15] 3,682,284
[45] Aug. 8, 1972

[54] ROLLING SURFACE CONSTRUCTION
[72] Inventor: Minoru Sakamoto, 3005 Uglena St., Honolulu, Hawaii 96819
[22] Filed: Oct. 29, 1970
[21] Appl. No.: 85,165

[52] U.S. Cl.............................................193/35 MD
[51] Int. Cl...............................................B65g 13/00
[58] Field of Search................................193/35 MD

[56] References Cited

UNITED STATES PATENTS

| 1,568,362 | 1/1926 | Brown | 193/35 MD |
| 2,949,992 | 8/1960 | Weinberg | 193/35 MD |

FOREIGN PATENTS OR APPLICATIONS

| 701,114 | 1/1931 | France | 193/35 MD |

Primary Examiner—Evon C. Blunk
Assistant Examiner—Hadd S. Lane
Attorney—Clarence A. O'Brien and Harvey B. Jacobson

[57] ABSTRACT

A surface defined by a plurality of hard balls retained in rolling captivity with a portion of the outer surfaces thereof continually exposed for the rolling support of a person or object thereon. The balls are retained between friction adjusting bolts or within a crossed rail grid, and are surrounded by bolt retaining cover plates or a unitary cover panel incorporating ball accommodating openings therein.

14 Claims, 9 Drawing Figures

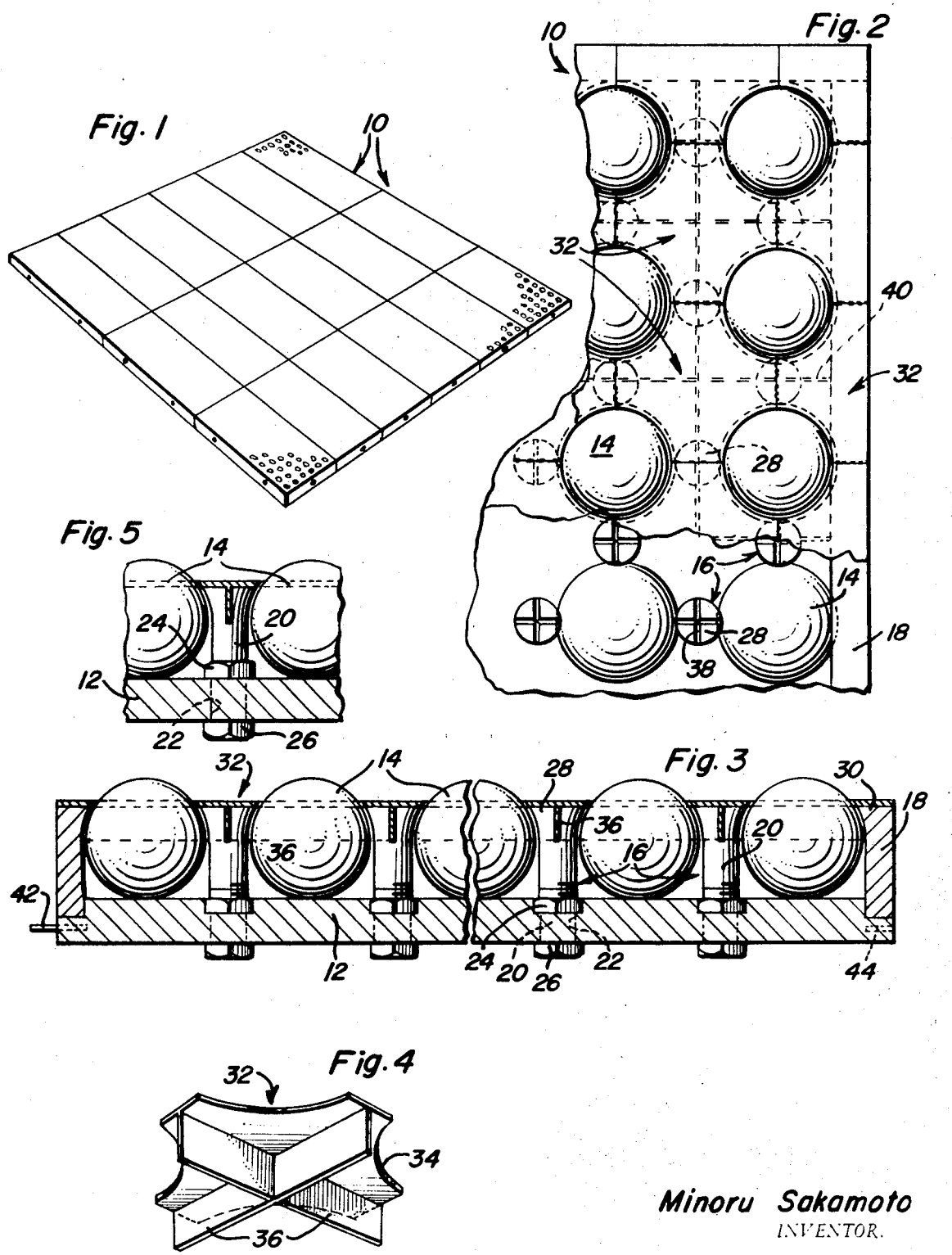

Minoru Sakamoto
INVENTOR.

ROLLING SURFACE CONSTRUCTION

The instant invention is concerned with the provision of a rolling surface unit particularly adapted for use as flooring to provide a gliding surface for persons, such as in ballroom dancing or the like or objects which must be transported from one location to another.

It is a primary intention of the instant invention to provide a rolling surface composed of a plurality of freely rotating balls or spheres wherein the balls are mounted in a unique manner which ensures substantial freedom of movement in conjunction with a simplicity of construction and ease of maintenance.

Basically, the features of the invention are incorporated into portable units, usable singly or in conjunction with additional units so as to define an enlarged area. Each of the units, in one form of the invention, retains the surface defining balls within seats formed by ball surrounding screws particularly configured so as to rollingly retain the balls. The screws are in turn adjustable so as to vary the frictional engagement with the balls and are interconnected by screw locking cover plates. In another variation, the balls are seated within an upwardly opening grid and retained therein by an overlying apertured panel, the apertures in which accommodate the surface forming projecting portions of the balls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a floor formed of a plurality of units constructed in accordance with the instant invention;

FIG. 2 is a plan detail of the rolling surface construction;

FIG. 3 is an enlarged typical cross-sectional detail through the construction;

FIG. 4 is a perspective view of one of the cover plates;

FIG. 5 is a cross-sectional detail illustrating another manner of mounting the retaining bolts;

Figure 6:
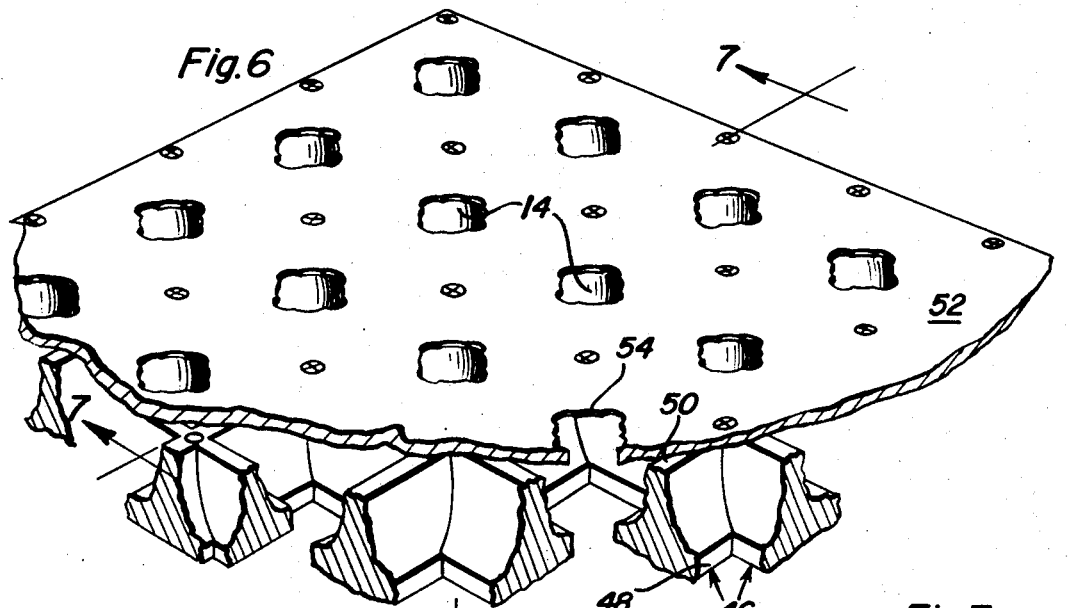
FIG. 6 is a perspective detail of a variation in the construction of the instant invention.

Referring now more specifically to the drawings, reference numeral 10 is used to indicate a unit constructed in accordance with the instant invention. Each of the units 10, it being contemplated that a plurality of the units be interconnected so as to provide an enlarged floor area for ballroom dancing or the like, is to be of a size so as to make it readily portable.

In actual construction, the unit 10 includes a flat base panel 12 which rollingly receives a plurality of hard balls or spheres 14 retained in a predetermined grid-like orientation by means of retaining bolts 16 and a peripheral wall 18.

Each of the bolts 16 has the lower portion of the shank 20 threaded and received through preformed holes 22 formed in the base plate 12 with the height of the individual bolts 16 being adjusted through a manipulation of upper and lower nuts 24 and 26 threaded on the bolts. Noting FIGS. 3 and 5, the upper nuts 24 can either be received within countersunk recesses formed in the upper surface of the base panel 12 or seat directly on the upper surface of the base panel. By the same token, while not illustrated, suitable counterbores or recesses can also be provided for the lower nuts 26 and lower ends of the bolt shanks 20.

Each of the bolts 16 includes an enlarged upper head 28 which defines in effect an integral outwardly flared continuation of the shank 20 with the curvature of the undersurface or periphery of the head or head portion 28 of each bolt 16 conforming generally to that of the balls 14 to be retained thereby.

Each ball or sphere 14, aside from those about the periphery of the unit 10, is surrounded and retained by four bolts 16 with the bolts being adjustable so as to provide for a substantially free rolling retention of the balls 14 within the individual pockets or seats formed therefor. The peripherally located balls 14 are each retained by three of the bolts 14 and the adjoining portion of the peripheral side wall 18. This side wall 18, as will be appreciated from the drawings, has the upper or head portion 30 thereof flared inwardly so as to define a slightly concave configuration conforming to that of the bolt heads 28 for ball retaining cooperation therewith.

Cover plates 32 are provided between the retained balls 14, functioning as a means for excluding dust, dirt and the like from the ball seats, and also functioning as a further means for retaining and stabilizing the bolts or studs 16. Noting FIG. 4, each of the cover plates 32 includes a top panel having four arcuate concave edge recesses 34 and two depending crossed ribs or flanges 36 rigid with the top panel. The concave edge recesses 34 conform to the curvature of the balls 14 generally at the plane of the flat tops of the stud heads 28. In this manner, upon a mounting of the individual cover plates, a planar surface is formed which, in effect, has a series of circular openings therein for the projection of the balls 14 therethrough. The mounting of each of the cover plates 32 is effected by an engagement of the end portions of the depending ribs or flanges 36 within crossed kerfs 38 provided in the flat tops of the stud or bolt heads 28. Noting FIG. 2 in particular, it will be appreciated that each head 28 receives the end portions of a pair of aligned ribs 36 of a pair of adjoining cover plates 32. Each cover plate in turn encircles one quarter of the four adjoining balls so as to combine with the three additional cover plates associated with each ball so as to completely encircle the particular ball 14. Each peripheral edge of the top panel of each cover plate 32 is, aside from the concave recesses 34 therein, straight so as to closely conform to the adjoining cover plates 32 and provide in effect a closed joint therebetween. The cover plates 32', provided about the periphery of the unit 10, will, in each instance, accommodate only two balls 14, and hence will be modified in an obvious manner to provide a single kerf engaging foreshortened rib 40 for engagement with the single associated bolt 16 and enable a seating of the top panel portion thereof on the upper surface of the adjoining portion of the wall 18. If deemed necessary, these peripheral cover plates 32 can be screwed or otherwise secured to the peripheral wall 18.

Constructed in this manner, it will be appreciated that access to the balls for cleaning, replacement or adjustment can be easily had with this particular construction enabling maintenance work on small section of the unit without requiring a dismantling of the entire unit. Further, the unit, when assembled, provides a highly effective rolling surface wherein the balls are rollingly retained in a predetermined pattern and, aside from the exposed upper portions thereof, enclosed in a protective manner.

Figure 9:
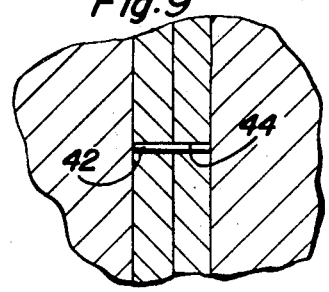
FIG. 9 is a detail illustrating one manner of interconnecting adjacent units.

The surface thus formed is usable as a dance floor or as a means for facilitating the movement of various loads from one location to another. The interengagement between the easily carried individual units 10 so as to provide for an enlarged area can be effected in any appropriate manner. For example, as suggested in the drawings, the individual units can be provided with projecting pins 42 along two sides thereof and pin receiving bores 44 along the remaining two sides thereof for a sliding interlock of the units. This manner of joining the units is detailed in FIG. 9.

Figure 7:
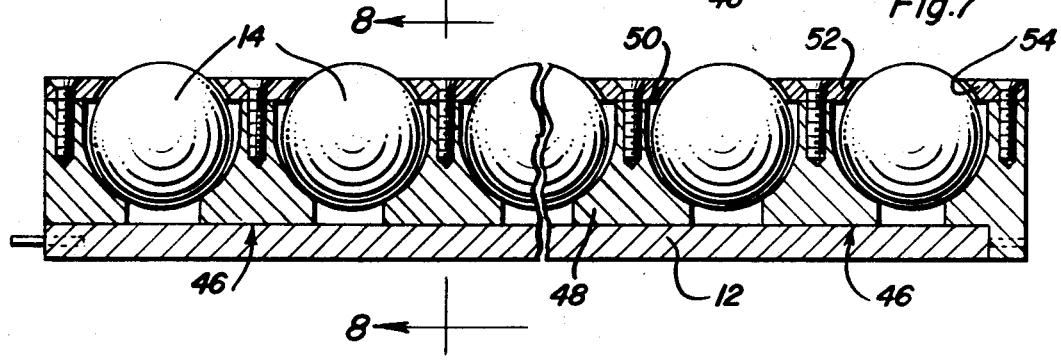
FIG. 7 is an enlarged cross-sectional detail taken substantially on a plane passing along line 7—7 in FIG. 6.
Figure 8:
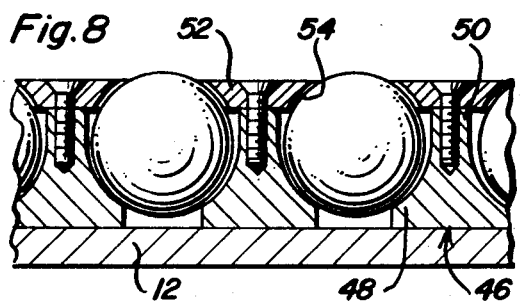
FIG. 8 is a cross-sectional detail taken substantially on a plane passing along line 8—8 in FIG. 7.

A variation of the rolling surface construction is illustrated in FIGS. 6, 7 and 8. In this variation, a grid arrangement of ball receiving pockets is provided by a network of crossing rails 46 rigidly affixed to the upper surface of the base panel 12. The rails 46 are arranged in two right angularly orientated series so as to define rectangular pockets for the individual reception of the balls or spheres 14. Each of the rails 46 has an enlarged flat base 48 and a flat narrow top portion 50 with the longitudinal side walls between the base 48 and top 50 being generally concave so as to approximately follow the curvature of the balls 14. As will be appreciated from FIG. 7 and 8, the rails 46 are so positioned as to seat and retain the balls or spheres 14 in an elevated position above the base panel 12 while at the same time allowing for a vertical introduction and removal of the balls to and from the rail formed pockets or seats. As will be apparent from the drawings, the peripheral or outer rails will incorporate a flat outer surface so as to provide a finished appearance to the individual unit.

The balls are rollingly retained within the grid arranged seats by means of a single overlying cover or top panel 52, screwed or bolted to the flat upper surfaces of the grid forming rails 46, normally at the crossing or junction points therebetween. This top or cover panel 52 is provided with a series of openings 54 therethrough which align with the seat received balls 14 and allow for a projection of the upper portions of the balls 14 therethrough so as to provide the desired rolling surface. Incidentally, it will of course be appreciated that the balls 14 seat on the rails 46 in a manner so as to project sufficiently thereabove so as to be exposed through the holes or apertures 54 provided in the cover panel 52. Each of the apertures 54 has a general cloverleaf configuration. In this manner, rather than engaging each of the balls 14 completely thereabout, contact is made with each ball at four spaced points. In this manner, there will obviously be less tendency to interfere with the desired free rolling of the ball.

It will be appreciated that the cover panel 52 protectively encloses the balls 14 and seats therefor, and is at the same time readily removable for any maintenance which may be required. The construction illustrated in FIG. 6, 7 and 8 is to also preferably be used in conjunction with the formation of portable units interlockable with similarly formed units so as to define enlarged surfaces for whatever purpose desired.

While no particular materials have been mentioned, it will be appreciated that the various components of the invention can be formed of any materials which will afford the appropriate stability and wear characteristics required in construction of the type herein involved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Rolling surface construction comprising seat defining means arranged in a predetermined pattern and presenting a plurality of outwardly opening seats, a plurality of balls, one ball being rotatably received within each seat and projecting outwardly therebeyond, panel means overlying said seat defining means and surrounding said balls in close conformance thereto, said balls projecting through said panel means and outwardly therebeyond to define a rolling surface, and a base panel underlying and mounting said seat defining means, said seat defining means comprising a plurality of studs fixed to said base panel and projecting outwardly therefrom, said studs being arranged in spaced ball confining relation about each ball each stud having an enlarged head thereon, said balls being rotatably retained between the stud heads and the underlying base panel.

2. The construction of claim 1 wherein said stud heads are configured so as to generally conform to the arcuate configuration of the balls.

3. The construction of claim 2, wherein said studs are adjustably secured to said base panel for a selective longitudinal adjustment relative thereto.

4. The construction of claim 3 wherein said panel means comprises a plurality of individual cover plates positioned between adjoining balls.

5. The construction of claim 4, wherein said cover plates engage and lock to said studs.

6. The construction of claim 5, wherein the head of each stud includes kerf means therein, said cover plates including depending ribs engaged within said kerf means.

7. The construction of claim 1, wherein said studs are adjustably secured to said base panel for a selective longitudinal adjustment relative thereto.

8. The construction of claim 1, wherein said panel means comprises a plurality of individual cover plates positioned between adjoining balls.

9. The construction of claim 8, wherein said cover plates engage and lock to said studs.

10. Rolling surface construction comprising seat defining means arranged in a predetermined pattern and presenting a plurality of outwardly opening seats, a plurality of balls, one ball being rotatably received within each seat and projecting outwardly therebeyond, and panel means overlying said seat defining means and surrounding said balls in close conformance thereto, said balls projecting through said panel means and outwardly therebeyond to define a rolling surface, said seat defining means comprising a plurality of elongated rails arranged in a grid-like pattern, each rail including a full length enlarged base portion, a full length reduced outer portion and opposed sides concave so as to generally conform to the curvature of the balls, said concave sides extending along approximately the full length of said rails.

11. The construction of claim 10, wherein said panel means includes a plurality of ball accommodating openings therein, said openings each defining spaced points of engagement with the corresponding ball.

12. Rolling surface construction comprising a base panel, a plurality of studs fixed to said base panel and projecting outwardly therefrom so as to define a plurality of outwardly opening ball receiving seats, a plurality of balls received in said seats and projecting outwardly beyond said studs to define a rolling surface, a plurality of individual cover plates positioned between adjoining balls said plates defining apertures through which said balls partially project, and means for releasably locking each cover plate to selected ones of the studs about the adjoining balls.

13. The construction of claim 12 wherein said studs are adjustably secured to said base panel for a selective longitudinal adjustment thereof relative to the base panel, the studs being affixable upon removal of the associated individual cover plates.

14. The construction of claim 12, wherein each stud has an enlarged head on the outer end thereof configured so as to generally conform to the arcuate configuration of the balls for a rotatable retention of the balls between the stud heads and the underlying base panel.

* * * * *